United States Patent [19]

Hindman et al.

[11] Patent Number: 4,612,116
[45] Date of Patent: Sep. 16, 1986

[54] BACKWASHABLE FILTERING APPARATUS AND NOVEL FILTER ELEMENT THEREFOR

[75] Inventors: David B Hindman; Joseph D. Lima, both of Rochester, N.Y.

[73] Assignee: French Systems, Inc., Rochester, N.Y.

[21] Appl. No.: 716,682

[22] Filed: Mar. 27, 1985

[51] Int. Cl.⁴ .............................................. B01D 41/04
[52] U.S. Cl. .............................. 210/333.1; 210/411; 210/497.01
[58] Field of Search ............... 210/332, 333.01, 333.1, 210/427, 411, 412, 497.01, 497.3

[56] References Cited

U.S. PATENT DOCUMENTS 2,237,964  4/1941  Haught ............................ 210/333.1
3,157,131  11/1964  Brydon ............................ 210/333.1

Primary Examiner—Frank Sever
Attorney, Agent, or Firm—Shlesinger, Fitzsimmons & Shlesinger

[57] ABSTRACT

A plurality of filter housing are arranged around a hollow hub section the interior of which is divided into an inlet chamber for receiving fluid under pressure to be filtered, an outlet chamber for receiving filtered fluid, and a backwash chamber that is connected to a waste line. Each filter housing contains an inverted, frusto-conically shaped filter element having a closed lower end, and an open upper end connected to the outlet chamber of the hub section. Fluid that is to be filtered normally flows from the inlet chamber through a first series of valves to the lower ends of the filter housings, and then radially inwardly through the walls of the filter elements and out of the upper ends thereof and through a second series of valves to the outlet chamber. Because of its configuration, the pressure gradient across a respective filter element is substantially uniform throughout the entire axial length of the element, so that fluid is caused to flow through the entire useful surface of the element throughout its axial length. The lower ends of the filter housings can be selectively connected by a third series of valves with the backwash chamber. The first and third valves for each housing are interconnected, so that when a backwashing operation becomes necessary, the first valve is automatically closed at the time that the third valve opens, thereby causing a portion of the previously filtered fluid to flow in a reverse direction through the associated filter housing to the backwash chamber.

15 Claims, 7 Drawing Figures

BACKWASHABLE FILTERING APPARATUS AND NOVEL FILTER ELEMENT THEREFOR

BACKGROUND OF THE INVENTION

This invention related to improved backwashable filtering apparatus for machine tool lubricating coolants and the like, and more particularly to a novel filter element for use in such apparatus.

It has long been customary in connection with certain filtration systems, for example such as those employed for filtering machine tool lubricating coolants, to utilize a plurality of tubular filter elements for removing metal particles and the like from used fluid coolant before recirculating it back to the machine tools. During filtration the fluid is forced under pressure radially through the porous annular walls of the elements until the walls of the elements become unduly dirty or clogged. At that time the elements are momentarily disconnected from the system and are "backwashed" by pumping some of the previously filtered fluid in a reverse directon through the annular walls of the dirty elements, thus causing debris to be discharged from the element walls to a backwash outlet. Thereafter the cleaned elements are reinserted into the system line.

In one such prior apparatus (see for example U.S. Pat. No. 4,482,461), a plurality of tubular filter elements are mounted in a housing normally to be connected in the system line which contains the fluid under pressure that is to be filtered. The fluid is caused to pass into the bores of the elements, and then radially outwardly through the porous annular walls thereof to a common outlet. Whenever the pressure drop across the filter housing indicates that the elements are dirty, a tubular backwashing arm, which is mounted to rotate in one end of the housing, is rotatably indexed into communication with the adjacent ends of the tubular elements, one after the other, so that the elements are successively and momentarily subjected to a backwashing operation before being reinserted into the system line.

Known filtering apparatus of the type described has the disadvantage that it requires specially designed mechanisms for operating the indexible backwashing arm whenever a backwashing operation is necessary. Still another disadvantage of apparatus of this type is that only a portion of each tubular filter element is used at any instant, and each element tends to become plugged or clogged progressively, commencing from one end thereof and progressing toward its opposite end during a filtering interval—i.e., the interval of time during which a filter element is operatively connected in the system line. In other words, when a clear, tubular filter is first introduced into a system line, the radial flow to fluid from the inside to the outside of the filter is distributed over only a fraction of the total area of the filter element, normally adjacent the outlet end of the filter housing. As this area becomes plugged with dirt, the pressure gradient between the inside and the outside of the element seeks equilibrum by moving along the length of the tubular filter toward the opposite end thereof, thus causing the radial flow also to shift progressively toward the opposite end of the element until eventually the entire filter is dirty. At such time the pressure gradient suddenly increases rapidly, thus indicating that a backwashing operation or the like is necessary in order to clean the element.

It is an object of this invention to provide for a filtration system of the type described, improved backwashable filtering apparatus which is substantially easier to manufacture and to operate than prior such apparatus.

More specifically, it is an object of this invention to utilize a special valving system for controlling the direction of flow of fluid through filter elements in backwashable apparatus of the type described, thus obviating the need for employing rotatably indexible backwashing arms of the type heretofore employed in such apparatus.

Still another object of this invention is to provide for use in backwashable filtering apparatus of the type described a novel filter element which is substantially more hydraulically efficient than prior such filter elements, and which is designed in such manner that the pressure gradient and flow of fluid during a filtering operation are distributed across the entire surface area of the element rather than across a portion only thereof.

Other objects of the invention will be apparent hereinafter from the specification and from the recital of the appended claims, particularly when read in conjunction with the accompanying drawings.

SUMMARY OF THE INVENTION

A plurality (eight in the illustrated embodiment) of filter housings are equiangularly spaced around the outside of a tubular hub section, the bore of which is partitioned into a clean fluid chamber, dirty fluid chamber, and a backwash chamber which communicates with a waste pipe. Each housing contains a removable, inverted, frusto-conically shaped filter element the bore of which is closed at its lower end but which communicates at its upper end through a first valve with the clean fluid chamber in the hub section. The lower end of each housing communicates selectively through a second valve with the dirty fluid chamber of the hub, and through a normally-closed third valve with the backwash chamber.

In use, the dirty fluid chamber is connected to a supply of fluid under presure that is to be filtered, and the clean chamber is connected to a line that is to supply clean-filtered fluid to, for example, machine tools or the like. The first and second valves are normally open so that dirty fluid normally enters the lower end of each housing flows radially through each filter along substantially its entire axial length, and then passes as filtered fluid through the first valve and clean fluid chamber to the system line.

The second and third valves of each housing are interconnected by backwashing control means which, when an element becomes dirty, momentarily causes its associated second valve to close, and its associated third valve to open, so that a portion of fluid from the clean fluid chamber is caused to flow in a reverse direction through the dirty element and the backwash chamber to the waste pipe.

The frusto-concially shaped filter elements are designed so that fluid flows radially through substantially the full, usable filtering area of the element as soon as the element is placed in use, and so that when a backwashing operation takes place, fluid is forced in a reverse direction through substantially all of the interstices in the element so that it is cleaned throughout its entire axial length.

THE DRAWINGS

DETAILED DESCRIPTION OF THE PREFERRED EMBODIMENTS

Figure 1:
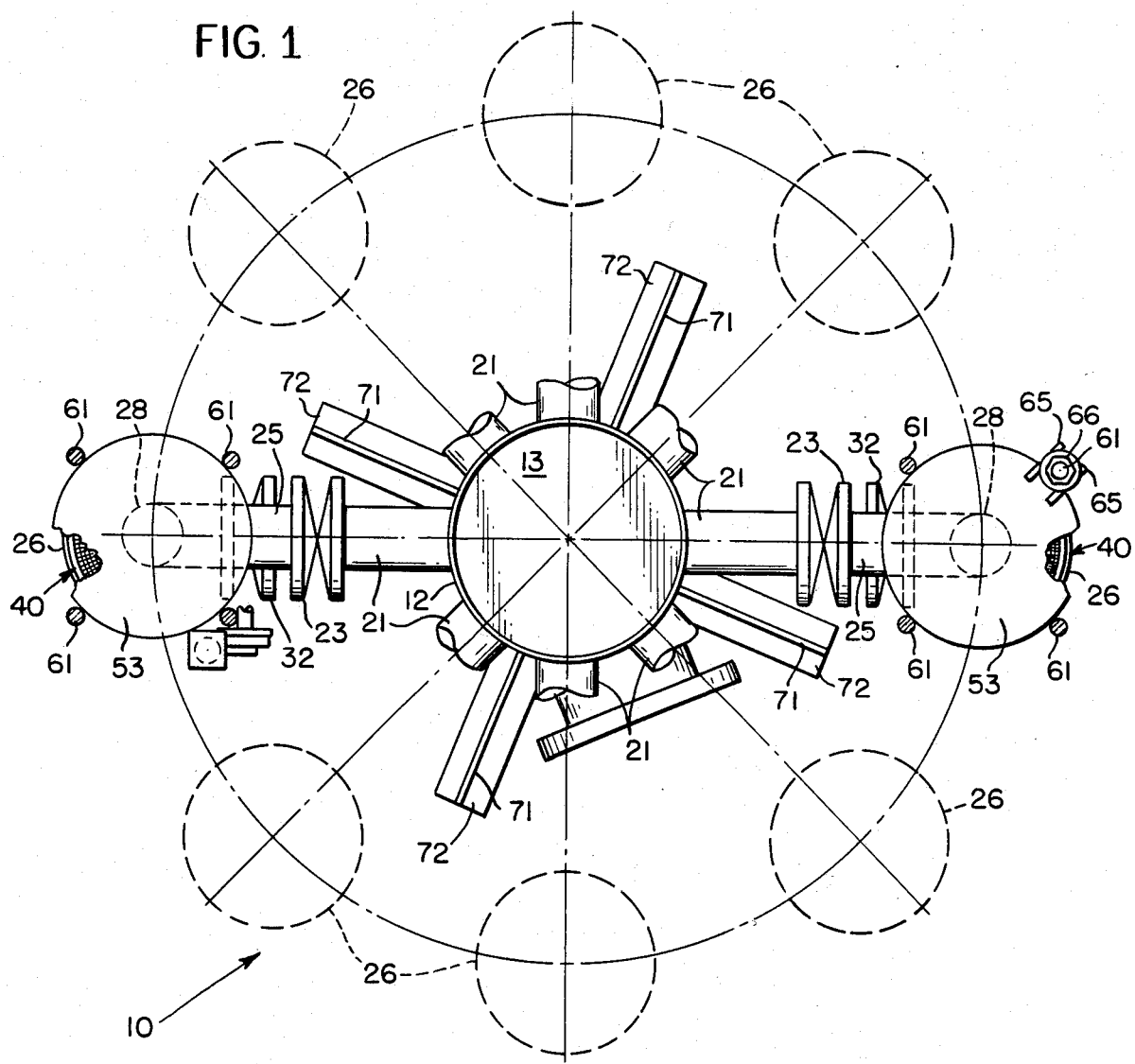
FIG. 1 is a fragmentary plan view of improved backwashable filtering apparatus made according to one embodiment of this invention, portions of the apparatus being broken away and shown in section, and other portions being shown in phantom by broken lines.
Figure 2:
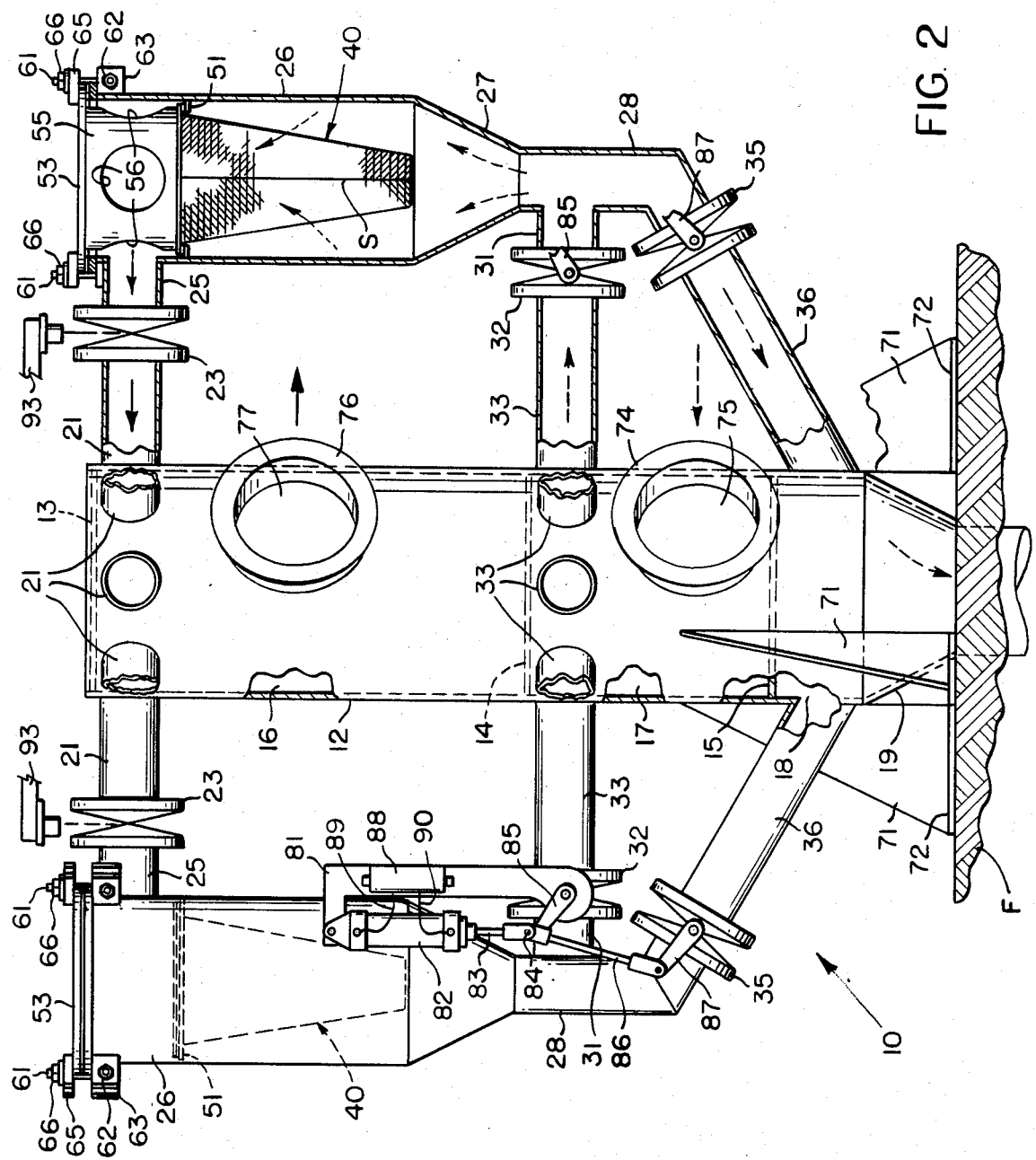
FIG. 2 is a fragmentary front elevational view of this apparatus with portions thereof again being broken away and shown in section.

Referring now to the drawings by numerals of reference, and first to FIGS. 1 and 2, 10 denotes generally improved backwashable filtering apparatus comprising a tubular hub or center section 12, which is closed at its upper end by a circular cover plate 13. Secured in the bore of hub 12 intermediate its ends are two, transverse, axially-spaced plates 14 and 15, which divide or partition the bore into three separate chambers, comprising an outlet chamber 16, which is located between the plates 13 and 14 for receiving, clean, filtered fluid; an inlet chamber 17, which is located between plates 14 and 15 for receiving dirty fluid which is to be filtered; and a backwash outlet chamber 18, which is located beneath plate 15 to receive fluid after it has been backwashed through an associated filter element as noted hereinafter. Chamber 18 is connected at its lower end to a funnel-shaped outlet 19, which is adapted to be connected in any conventional manner to a waste pipe or the like for conveying away the dirty backwash fluid which enters chamber 18.

Secured to and projecting radially from the tubular hub section 12 adjacent its upper end are eight, equiangularly spaced pipes 21, each of which communicates at one end through a registering opening in the hub 12 with the outlet chamber 16, and at its opposite end through a valve 23 and another section of pipe 25 to the upper end of a cylindrical filter housing 26. (Although only two such filter housings 26, valves 23, and associated pipe connections are shown in full by solid lines in FIGS. 1 and 2, it is to be understood that in the embodiment illustrated eight such housings 26 and valves 23 are arranged around the outside of the hub 12 in equiangularly spaced relation, as evidenced for example by the additional housings 26 which are shown in phantom by broken lines in FIG. 1.). Each filter housing 26 has a frusto-conically shaped lower end 27, which communicates with the upper end of one of eight, vertically disposed inlet/outlet pipe sections 28. Each of the pipe sections 28 is connected intermediate its ends by a radial pipe section 31 with one side of a valve 32, the opposite side of which is connected by another pipe section 33 with one of eight circular openings that are formed in the hub section 12 adjacent the upper end of its chamber 17. Each pipe section 28 is also connected at its lower end through one of eight valves 35 with one of eight, inclined pipe sections 36, each of which opens at its lower end on chamber 18 in the hub 12 at equiangularly spaced points about the hub axis.

Removably mounted in each of the housings 26 is a wire strainer or filter element 40, which is substantially frusto-conical in configuration. As shown more clearly in FIGS. 3–5, each filter element 40 comprises a plurality of parallel, diagonally extending wires 41, which are generally triangular or V-shaped in cross section. The wires 41 of each element 40 are equispaced from each other around the axis of the associated element, and have their apices facing inwardly toward the element axis. In the embodiment illustrated each element 40 is made in four sections the longitudinal side edges of which are welded together along four seams S which lie in a pair of planes that intersect along the filter axis. Certain of the wires 41 are welded or otherwise secured at their lower ends to the outer marginal edge of a metal disc 42, which forms the lower, closed end of each element 40, and some are secured at their upper ends to a metal ring 43, which surrounds the upper end of each element. Intermediate their ends the wires 41 of each element are resistance welded or otherwise secured at spaced points therealong to a plurality of circular, axially-spaced ring supports 44, which cooperate with wires 41 to form in each element a plurality of small slots or interstices through which fluid is adapted to flow as noted hereinafter.

Figure 4:
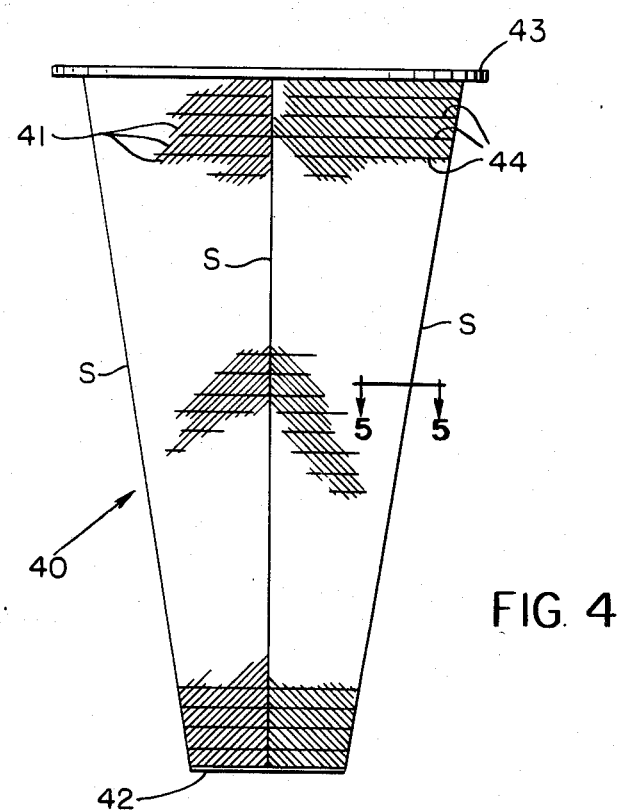
FIG. 4 is a front elevational view of this filter element with portions thereof being broken away and shown in section.
Figure 3:
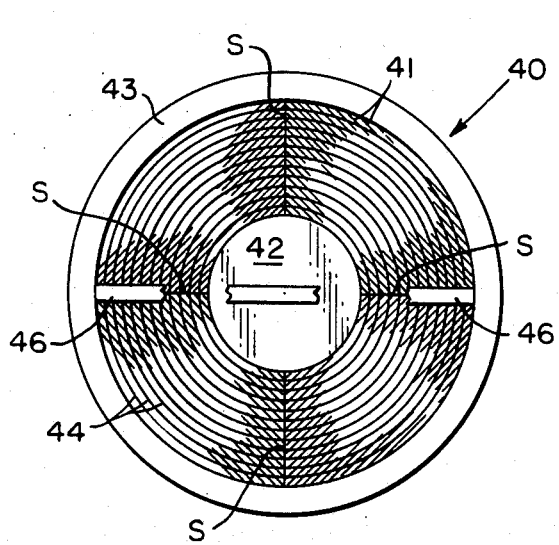
FIG. 3 is a plan view of an improved filter element of the type that is employed in the apparatus shown in FIGS. 1 and 2.
Figure 5:
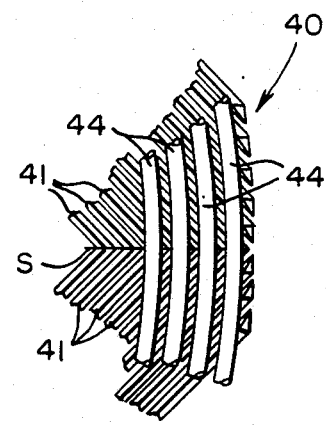
FIG. 5 is a fragmentary sectional view of this element taken generally along the line 5—5 in FIG. 4 looking in the direction of the arrows, and on a slightly enlarged scale.

As shown more clearly in FIG. 4, the ring 43 surrounding the upper end of each filter element 40 projects laterally radially beyond the upper ends of the associated wires 41 to form a support for the filter element as noted hereinafter. Also, as shown in FIG. 3, a metal strap 46 is secured at opposite ends thereof to the ring 43 at diametrally opposite sides thereof in order to form a handgrip for use in removing a filter element 40 from, or inserting it into, one of the filter housings 26.

Referring again to FIGS. 1 and 2, each of the filter housings 26 has secured therein adjacent its upper end an internal annular shoulder or filter element support 51, the bore of which is disposed coaxially of the associated filter housing. Releasably secured to the flanged upper end of each filter housing 26 is a circular cover plate 53. Secured to and coaxially projecting from the underside of each cover plate 53 is a tubular outlet pipe or sleeve 55, the axial length of which is approximately equal to the distance between the filter element support 51 and the upper end of the associated filter housing 26. Intermediate its ends each sleeve 55 has formed through its annular wall at ninety degree intervals thereabout four rather large, circular openings 56, at least one of which is disposed to register coaxially with a filter housing outlet pipe 25, when the associated cover plate 53 is secured over the housing as shown in FIG. 2.

Removably and coaxially mounted in each filter housing 26 with its flanged upper end 43 overlying the associated filter support 51 is one of the frusto-conical filter elements 40. The flanged end 43 of each element 40 is secured against a gasket on the associated support 51 by the underside or lower end of the outlet sleeve 55, which projects downwardly from the associated housing cover 53. In the embodiment illustrated each housing cover 53 and its associated outlet sleeve 55 are secured against a gasket on a respective filter housing 26 by means of four, equiangularly spaced locking bolts 61, each of which is mounted at its lower end to swing vertically about one of four, horizontally disposed pins 62 (FIG. 2), which are supported by brackets 63 at each of four equiangularly spaced points around the axis of the associated housing 26. Each bolt 61 is disposed to be swung at its upper end into the space between one of four pairs of spaced radial lugs 65 (FIG. 1) which project from each cover plate 53 adjacent its outer marginal edge at ninety degree intervals thereabout. Each bolt 61 is then secured against movement between the associated lugs 65 by a nut 66, which is removably threaded downwardly against the lugs 65, and if desired, a washer which can be disposed between the lugs and the nut.

Projecting radially from the lower end of the tubular hub section 12 of the apparatus 10 are four, equiangularly spaced angle plates 71, the lower ends of which are secured to four radially projecting feet or base plates 72, which are adapted to be bolted or otherwise secured to the plane, upper surface of a stationary support F. The system line, which contains the fluid which is to be filtered, is then connected to the bore of an annular boss 74, which is secured to the outside of the hub 12 adjacent its lower end to register with a fluid inlet opening 75 that is formed in the annular wall of the hub to communicate with chamber 17. The system line which is to receive the filtered fluid is then connected to another annular boss 76, which is formed on the hub 12 adjacent its upper end to communicate with a clean fluid outlet opening 77.

During a normal filtering operation the valves 23 and 32 are open and the halves 35 are closed, so that fluid that is to be filtered enters the chamber 17 and then passes radially outwardly through the pipes 33, valves 32, and pipe sections 31 and into the lower ends of the filter housings 26 in the direction indicated by the arrows represented by broken lines in FIG. 2. This dirty fluid then passes radially inwardly through the openings or interstices in the filter elements 40 and out of the aperatures 56 in the associated outlet sleeve 55, and then through the outlet pipes 25, valves 23, pipe sections 21 and the outlet chamber 16 to that portion of the system line which is connected to the boss 76.

Whenever a filter element 40 becomes unduly clogged or dirty, as determined for example by a monitoring system which forms no part of this invention, clean fluid from chamber 16 is caused to flow in a reverse direction through that particular filter element, and then out of its backwash outlet pipe 36. This reverse flow is effected by closing the valve 32, which is associated with the filter housing 26 containing the element 40 that is to be cleaned, while simultaneously opening the associated valve 35 that is located in the backwash outlet pipe 36 for that particular housing.

One manner in which this backwash operation can be effected is shown by way of example on the left side of FIG. 2, wherein 81 denotes a right angular bracket that is fixed at its lower end, for example, to one side of the valve 32. Projecting downwardly from the upper end of bracket 81 is a pneumatic cylinder 82 from the lower end of which projects a reciprocable piston rod 83, which is pivotally connected by a pin 84 to the operating arm 85 of the valve 32, and by a link 86 to the operating arm 87 for the valve 35. A solenoid-operated valve 88, which is mounted on one leg of the bracket 81, is connected by lines 89 and 90 to opposite ends, respectively, of cylinder 82, and is operable selectively to supply air under pressure to one end or the other of cylinder 82, thereby selectively to shift the cylinder rod 83 between a retracted position, as shown in FIG. 2 wherein valve 32 is open and valve 35 is closed, and an advanced position (not illustrated), wherein the operating arms 85 and 87 are swung counterclockwise to close valve 32 and open valve 35.

Although only one such cylinder 82 and associated operating valve 88 have been illustrated and described in detail herein, it will be apparent to one skilled in the art that there is a separate cylinder 82 and operating valve 88 associated with each of the eight filter housings 26. Moreover, it will be appreciated that the exact system for monitoring the cleanliness of each filter element 40, and for selectively operating its assocaited solenoid valve 88 forms no part of this invention, and therefore has not been illustrated and described in detail herein.

From the foregoing it will be apparent that whenever one of the valves 88 is operated to cause the associated cylinder 82 to shift its operating stem 83 downwardly to close the associated valve 32 and to open the associated backwash valve 35, the dirty or incoming fluid in chamber 17 will be prevented from passing through the associated valve 32 to the lower end of the associated filter housing 26. On the other hand, since the backwash valve 35 of this particular housing 26 is open, at least a portion of the filtered fluid in the chamber 16 will be permitted to flow in a reverse direction through the pipe 21, valve 23 and pipe section 25 into the upper end of the associated filter housing 26, and then downwardly and radially outwardly through the associated filter element 40, and finally out through the pipe section 28 and associated backwash pipe 36 to outlet 19. This reverse of flow through the filter element 40 occurs suddenly, and causes dirt, which has collected on the outside of element 40 and in its slots or interstices to be flushed outwardly into the cylinder housing 26 and then downwardly out of the lower end thereof to the backwash outlet 19. After a brief interval of time the operating valve 88 is once again returned to its original position so that the associated backwash valve 35 once again closes, and the associated inlet valve 33 opens so that the now-cleaned filter element 40 is once again placed in an operating mode.

In addition to being able to control valves 32 and 35 with the solenoid-operated valves 88, each of valves 23 has an operating arm 93 (FIG. 2) by means of which the valve can be shifted manually between its open and closed positions so as to enable each filter housing 26 to be shut off from the clean fluid chamber 16 whenever desired. Thus when the valves 23 and 32 of a respective housing 26 are closed, the associated housing cover 53 may be removed to permit ready inspection or replacement of the associated filter element 40 without shutting down the others.

One of the principal advantages of this invention is attributable to the frusto-conical configuration of the associated filter element 40, and the particular direction in which fluid is caused to flow during the filtering and backwashing operations, respectively. For example, tests have indicated that when a conventional cylindrical filter element F (FIG. 6) is initially inserted into a system line to filter fluid, only a small portion of the filter element adjacent the outlet end of the filter housing H is utilized initially. As shown diagramatically in FIG. 6, fluid initially passes radially through only the portion of element F located a distance beneath the outlet pipe equal to approximately twice the diameter d of the outlet pipe. Moreover, as represented by the broken lines and arrows in FIG. 6, the rate of flow of this fluid through the element F diminishes to substantially zero at a point axially spaced downwardly a distance approximately 2 d from the upper or outlet end of the element. Furthermore, it has been determined that approximately eighty percent of the initial flow of fluid through the filter element F occurs through that axial portion of the filter lying beneath the upper end of the element a distance equal to the diamter of the filter outlet. As the fluid continues to flow through the element, and the upper end thereof becomes clogged, the flow rate gradient moves axially downwardly relative to element F, thus progressively using more of the filter element until its entire axial length becomes substantially clogged, at which time radial flow through the element is occuring only adjacent the lower end thereof.

Figure 6:
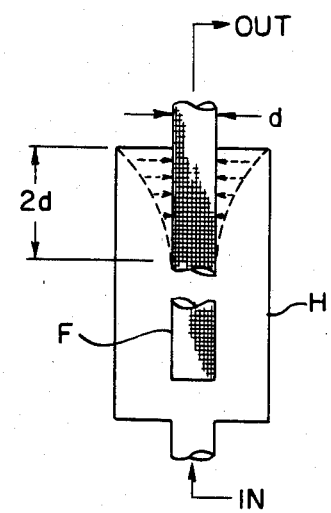
FIG. 6 is a schematic elevational view showing diagramatically the manner in which fluid flows through cylindrical filter elements of the type commonly used heretofore in backwashable filtering apparatus.

The disadvantage of this type of filter element is that it makes it very difficult to monitor its effectiveness and to effect proper backwashing thereof. For example, pressure drop across the element does not increase to a point indicating the need for a backwashing operation until the element has become clogged all the way down to its lower end (FIG. 6), at which time the flow of fluid through the element F is suddenly reversed. Unfortunately, however, tests have indicated that during such operation the backwashing fluid tends initially to flow radially through only the lower end portion of the element (i.e., the end remote from the clean fluid outlet), after which the pressure drop across the element suddenly decreases and terminates the backwashing operation. As a consequence, only the lower ends of filter elements of the type shown in FIG. 6 are cleaned, and a substantial axial portion of the element above the lower end thereof is not effectively cleaned by the backwashing operation.

Figure 7:
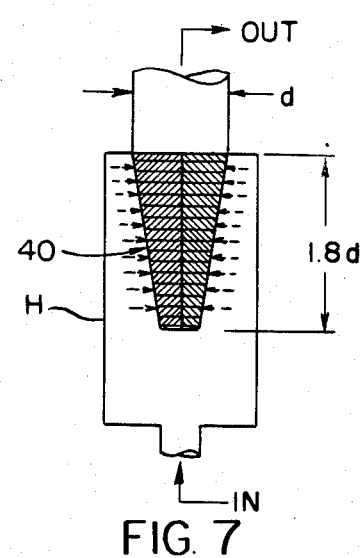
FIG. 7 is a view similar to FIG. 6 but showing how fluid flows through filter elements of the type made according to this invention.

One of the major advantages of utilizing a frusto-conically shaped filter element 40, such as shown for example in FIG. 7, is that the element can be designed so that when fluid is admitted into the lower end of the housing H it tends initially to pass radially through all of the openings in the element throughout its entire axial length. This has been determined by testing the flow of the fluid through the element for a brief period of time, and then removing the element 40 from housing and examining its interstices (filter openings). Tests have indicated that these openings tend to become uniformly dirty or clogged throughout the length of the element during its use. In other words, as soon as the element is placed in operation in a system line the pressure gradient between the inside and the outside of the element is such that fluid commences to flow radially through all of the pores of the element from one end of the element to the other. Moreover, another significant advantage of this type of element is that, when the element is subjected to a backwashing operation, the sudden reversal of flow of fluid back through the element likewise takes placed uniformly throughout the axial length of the element, so that during a single backwashing operation all of the pores or interstices in an element 40 are subjected to a cleaning operation. This not only reduces the time required for effecting a backwashing operation, but also results in a substantially more efficient filtering and backwashing operation.

The apparatus as shown in FIGS. 1 and 2 has been employed with a frusto-conically shaped filter element 40 eighteen inches in length, having a diameter at one end of ten inches and at its opposite end of four inches, and having a slot or interstice size of approximately 150 microns (approximately 0.006") by 0.5". This presents an overall flow area of approximately 36 square inches, which preferably is at least equal to the cross sectional area of the filter element outlet. The advantage is that such an element can be made substantially shorter than cylindrical filter elements, and as shown in FIG. 7 can have a height or length as small as less than two times the diameter of the filter outlet—e.g., 1.8 d where d is the diameter of the filter outlet.

From the foregoing it will be apparent that the present invention provides an improved filter element, and means for effecting the backwashing thereof in apparatus of the type described. By utilizing separate valves for controlling the flow of fluid through the associated filter housings, it is possible not only to replace or inspect a respecitve element without shutting down the rest of the system, but also selectively the filter elements can be backwashed one-by-one without using the more complicated indexing means heretofore employed. Moreover, as compared to known filter elements, the use of frusto-conically shaped elements results in lower velocities or flow rates of fluid radially through the elements, thus reducing particle migration (i.e. forcing of particles through the filter wall), and, thus substantailly improves the efficiency of the filtering operation. The use of such elements also results in far more effective backwashing, because each element is subjected to a reverse flow of the backwashing fluid throughout its axial length, thus assuring that all of the interstices are flushed clean.

While this invention has been illustrated and described in detail in connection with only certain embodiments thereof, it will be apparent that it is capable of still further modification. The wires 41, for example, could have a different cross sectional configuration, and could be made to extend circumferentially around the filter axis rather than diagonally thereof. Also, the exact number and disposition of the filter housings 26 could be varied without departing from this invention. It will be apparent also that this application is intended to cover any such additional modifications as may fall within the scope of one skilled in the art or the appended claims.

We claim:

1. In backwashable filtering apparatus of the type having a plurality of filter elements for filtering fluid under pressure, means for improving the uniformity of fluid flow through said filter elements, and for permitting selective removal and replacement thereof without shutting down the apparatus, said means comprising a hollow hub section having therein intermediate its ends a first transverse partition operatively dividing at least a portion of the interior of said hub section into a first chamber for receiving under pressure fluid that is to be filtered, and a second chamber for receiving filtered fluid, a plurality of filter housings positioned in angularly spaced relation around the outside of said hub section and each containing a removable filter element having therein a bore closed at one end, open at its opposite end, and surrounded by a porous wall, first and second valve means connecting each of said housings to said first and second chambers, respectively, in said hub section, and disposed normally to cause fluid to flow from said first chamber radially in a first direction through the porous walls of said filter elements and then to said second chamber, third valve means for selectively connecting said housings to a waste line, when the filter elements in said housings become dirty, means interconnecting said first and third valve means and operable, when one of said filter elements becomes dirty, simultaneously to disconnect the housing associated with said one filter element from said first chamber and to connect the last-named housing with said waste line, whereby a portion of previously filtered fluid is caused to flow from said second chamber in a reverse direction through the porous wall of said one element to said waste line, thereby to effect the backwashing of said one element, each of said filter elements being configured to provide substantially uniform pressure gradients thereacross, and fluid flow therethrough, during a filtering operation, and said first and second valve means being operable selectively to disconnect said housings one at a time from both said first and second chambers.

2. Backwashable filtering apparatus as defined in claim 1, including a second transverse partition secured in said hub section in spaced relation to said first partition and forming said hub section a third chamber which communicates with said waste line.

3. Backwashable filtering apparatus as defined in claim 2, wherein said third valve means are interposed between said housings and said third chamber selectively to connect a respective one of said housings to said third chamber during the backwashing of the associated filter element, and said first and second valve means include a pair of valves interposed between said hub section and each of said housings, one valve of each said pair thereof being disposed to control the flow of fluid from said one chamber in said hub section to one end of the associated filter housing, and the other valve of each pair thereof being disposed to control the flow of fluid between said second chamber and the opposite end of said associated filter housing.

4. Backwashable filtering apparatus as defined in claim 3, wherein said third valve means includes a third valve interposed between said one end of each filter housing and said third chamber, said means interconnecting said first and third valve means comprises a plurality of links each of which is operatively connected at opposite ends thereof to said first and third valves, respectively, of a respective valve housing, and each of said links is movable between a first position in which it opens the first valve and closes the third valve connected thereto, and a second position in which said first valve is closed and said third valve is opened.

5. Backwashable filtering apparatus as defined in claim 4, including means removably supporting each of said filter elements in its associated filter housing with the open end of the element communicating through the associated second valve with said second chamber, and with the closed end thereof disposed in spaced, confronting relation to said one end of the associated filter housing.

6. Backwashable filtering apparatus as defined in claim 1, wherein each of said filter elements is generally frusto-conically shaped in configuration and has the open end thereof normally communicating with one of said first and second chambers, respectively, and the closed end thereof communicating with the other of said first and second chambers.

7. Backwashable filtering apparatus as defined in claim 6, including means removably supporting said filter elements in said housings with said open ends of said elements communicating with said second valve means, and with the closed ends thereof communicating with said first valve means, whereby the fluid being filtered normally flows inwardly through the porous walls of the filter elements.

8. Backwashable filtering apparatus as defined in claim 7, wherein said supporting means comprises an internal flange formed in each of said housings adjacent one end thereof, an external flange surrounding each of said filter elements adjacent its open end, and removably seated on said internal flange of the associated housing operatively to support the closed end of the element in spaced, confronting relation to the opposite end of said associated housing, and a cover removably secured over an opening in said one end of each housing and having an annular projection on the inside surface thereof releasably engaged against the external flange on the associated filter element.

9. Backwashable filtering apparatus, comprising means defining a first chamber for receiving fluid under pressure that is to be filtered, means defining a second chamber for receiving fluid after it has been filtered, a filter housing having a first opening adjacent one end thereof connected to said first chamber to receive therefrom fluid that is to be filtered, and having a second opening adjacent the opposite end thereof connected to said second chamber to convey thereto fluid that has been filtered, valve means interposed between said filter housing and said chambers to control the flow of fluid in a first direction through said housing from said first to said second chamber, a frusto-conically shaped filter element releasably mounted in said housing between said first and second openings to filter the fluid passing through the housing in said first direction, said element having therein a frusto-conically shaped bore closed at its small end, open at its larger end, and surrounded by a porous wall through which passes the fluid that it is to be filtered, and means mounting said element in said housing so that the fluid flowing through the housing passes radially and substantially simultaneously through all of the pores in said element wall throughout the entire axial length thereof.

10. Backwashable filtering apparatus as defined in claim 9, including means mounting said element in said housing with said open end of the bore in said element communicating with said second opening in said housing, and with the closed end of said bore being disposed in spaced, confronting relation to said first opening in said housing.

11. Backwashable filtering apparatus as defined in claim 10, wherein said valve means further includes means operable, when the filter element in said housing becomes dirty, to disconnect said first opening from said first chamber, and substantially simultaneously to connect said first opening instead to a waste line, whereby at least a portion of the fluid under pressure in said second chamber is caused to flow in a reverse direction through said housing to backwash said element.

12. Backwashable filtering apparatus as defined in claim 11, wherein the distance between the open and closed ends, respectively, of said bore in said element is less than twice the diameter of said second opening in said housing.

13. In combination with backwashable filtering apparatus of the type in which fluid under pressure is passed in one direction through a filter element during filtering, and in the opposite direction during backwashing, an improved filter element comprising means through which fluid under pressure flows under a substantially uniform pressure gradient throughout the length of the filter element, said element being frusto-conically shaped and including, first and second pluralities of wires secured, respectively, in intersecting relation to each other to form a porous, metal wall which is frusto-conical in configuration, and which has therethrough a similarly shaped, frusto-conical bore, and a plate secured over and closing the smaller end of the bore in said wall, the larger end of said bore being open, the axial length of said wall being less than twice the diameter of the open end of said bore.

14. A filter element as defined in claim 13, wherein the ratio of the diameter of the closed end of said bore to the open end thereof is in the vicinity of 1:2.5.

15. A filter element as defined in claim 13, wherein an external flange is secured to and surrounds the open end of said porous wall, and a strap is secured at opposite ends thereof to diametrically opposite sides of said flange to form a hand grip for the filter element.

* * * * *